Feb. 1, 1944.   F. M. RAMSDELL   2,340,428
GAUGE
Filed May 27, 1943
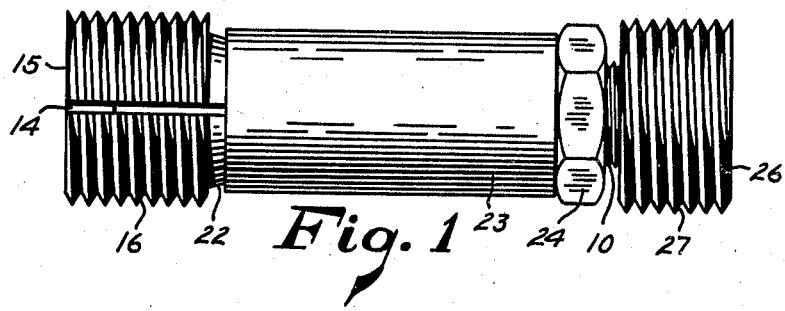
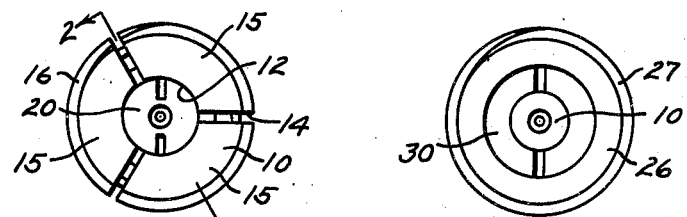
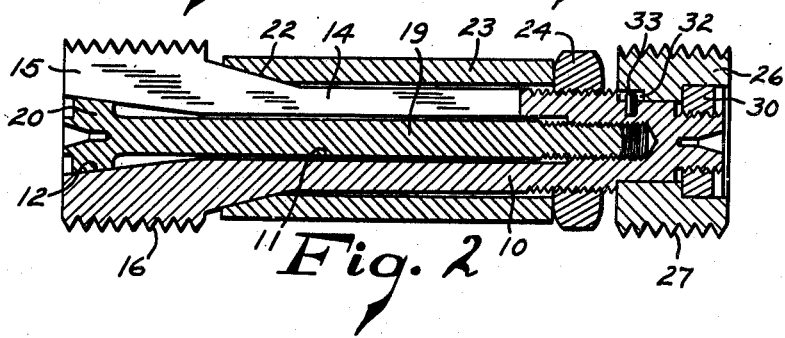
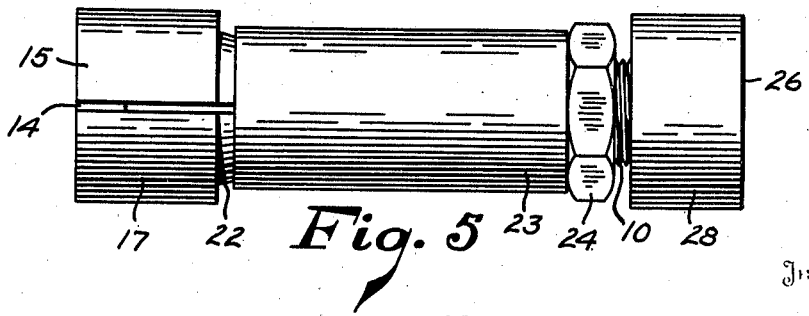
Inventor
FREDERICK M. RAMSDELL
By Albert G. Blodgett
Attorney Patented Feb. 1, 1944

2,340,428

UNITED STATES PATENT OFFICE 2,340,428

GAUGE

Frederick M. Ramsdell, Worcester, Mass.

Application May 27, 1943, Serial No. 488,678

2 Claims. (Cl. 33—199)

This invention relates to gauges, and more particularly to plug gauges for use in checking the size of holes in articles of manufacture.

It is a common practice to provide workmen or inspectors with a "go" gauge and with a "not go" gauge in order to assist them in determining whether or not a hole has been finished within the specified limits of size. If the hole is acceptable the "go" gauge will enter and the "not go" gauge will not enter. If the hole is a plain cylindrical hole, the gauge will be in the form of a cylindrical plug, whereas if the hole is threaded internally the gauge will be provided with external threads of the proper size. Plug gauges are very expensive to manufacture and it therefore is desirable to prolong their useful life as long as possible. However the "go" gauge in particular is subject to considerable wear from its insertion in the work pieces, and this gauge must be replaced rather frequently, since only a very slight reduction in the diameter of the gauge is permissible.

It is accordingly one object of the invention to provide a plug gauge which will have a far longer useful life than prior gauges of this type.

It is a further object of the invention to provide a plug gauge which can readily be adjusted in a simple and positive manner to avoid the effects of wear.

With these and other objects in view, as will be apparent to those skilled in the art, the invention resides in the combination of parts set forth in the specification and covered by the claims appended hereto.

Referring to the drawing illustrating one embodiment of the invention and in which like reference numerals indicate like parts, Fig. 1 is an elevation of a plug gauge for use with threaded holes;

Fig. 2 is a section on the line 2—2 of Fig. 3;

Fig. 3 is a view of the left hand end of the gauge;

Fig. 4 is a view of the right hand end of the gauge; and

Fig. 5 is an elevation similar to Fig. 1 but showing a gauge for use with plain cylindrical holes.

The embodiment illustrated comprises a body 10 having a central longitudinally extending bore 11 therein which terminates somewhat short of one end of the body. The outer portion 12 of this bore tapers inwardly at a slight angle. Three radial slots 14, equally spaced circumferentially, extend from the outer end of the body for a considerable distance along the same. These slots communicate with the bore 11, and they divide the adjacent portion of the body into three separate parallel fingers 15 which are integrally joined at their inner ends. The outer portions of the fingers, which surround the tapered portion 12 of the bore, are shaped to provide a gauging surface in the form of external screw threads 16 (as shown in Figs. 1 to 4) or in the form of a plain cylindrical surface 17 (as shown in Fig. 5). This gauging surface 16 or 17 provides a "go" gauge for insertion into a hole in a work piece to check the size thereof.

Means is provided to force the outer portions of the fingers 15 apart as may be necessary to overcome the effects of wear on the gauging surface and thus maintain the accuracy of the gauge. For this purpose the inner end of the bore 11 is threaded to receive the end of a screw 19, the outer end of this screw having a tapered head 20 thereon which fits within the tapered portion 12 of the bore. Directly behind the gauging surface, the external surfaces of the fingers 15 are shaped to provide an inwardly tapering cone 22. An elongated sleeve 23 surrounds the fingers behind the gauging surface, the outer end of this sleeve engaging the cone 22 and its inner end engaging a nut 24 which is threaded to the body 10 near the inner ends of the slots 14. This sleeve 23 holds the fingers firmly against the tapered head 20.

The inner end of the body 10 is slightly reduced in diameter to receive a ring 26 which is shaped to provide a gauging surface in the form of external screw threads 27 (as shown in Figs. 1 to 4) or in the form of a plain cylindrical surface 28 (as shown in Fig. 5). This gauging surface provides a "not go" gauge, and since it will not enter the holes in properly machined work pieces it is subjected to substantially no wear. The ring is held in place on the body 10 by a nut 30. To prevent turning of the ring 26 on the body, the ring is formed with a notch 32 to receive a pin 33 projecting radially from the body. This construction combines the "go" and "not go" gauges in a single conveniently usable device.

It will now be apparent that the "go" gauging surface 16 or 17 should be checked occasionally for size. When wear is evident, it is merely necessary to loosen the nut 24 and turn the screw 19 slightly inward to spread the fingers 15 the required amount. The nut 24 will then be tightened, so that the sleeve 23 will hold the fingers tightly against the tapered head 20, which will prevent accidental turning of the screw 19 and at the same time support the fingers in a rigid manner. By this means, the necessary accuracy of the gauge can be maintained over a long life of service and despite appreciable wear. If after long service the wear becomes irregular and it is not possible to restore the gauging surface by adjustment alone, the fingers can simply be spread enough to make the gauge slightly over the correct size, and the gauging surface can then be re-ground and lapped to the proper size and shape.

Having thus described the invention, what I claim as new and desire to secure by Letters Patent is:

1. A plug gauge comprising a body having a central longitudinal bore and a plurality of generally radial slots communicating with the bore, the slots dividing the body into a plurality of generally parallel fingers surrounding the bore and integrally connected at one end, the opposite end portions of the fingers being shaped to provide a gauging surface, the end of the bore adjacent the gauging surface being tapered inwardly, and the external surfaces of the fingers being shaped to provide an inwardly tapering cone directly behind the gauging surface, an axially adjustable device mounted in the tapered portion of the bore to force the fingers apart as required to overcome the effect of wear, and an axially adjustable sleeve surrounding the fingers behind the gauging surface and engaging the cone to hold the fingers firmly against the said device.

2. A plug gauge comprising a body having a central longitudinal bore with a threaded portion at the inner end of the bore and an inwardly tapered portion at the outer end of the bore, the body having a plurality of generally radial slots communicating with the bore for a considerable distance from the outer end thereof to divide the body into a plurality of fingers which are integrally connected at their inner ends, the outer ends of the fingers being shaped to provide a gauging surface with an inwardly tapering cone directly behind the same, a screw located within the bore with the inner end of the screw engaging the said threaded portion, the screw having a head on its outer end located within the tapered portion of the bore to force the fingers apart as required to overcome the effect of wear, an elongated sleeve surrounding the fingers behind the gauging surface, and a nut threaded to the body behind the sleeve to force the sleeve forwardly against the said cone and thereby hold the fingers firmly against the screw head.

FREDERICK M. RAMSDELL.